US006892147B2

(12) United States Patent
Bui et al.

(10) Patent No.: US 6,892,147 B2
(45) Date of Patent: May 10, 2005

(54) INFORMATION HANDLING SYSTEM INCLUDING A POWER MANAGEMENT APPARATUS CAPABLE OF INDEPENDENTLY SWITCHING BETWEEN A PRIMARY AND SECONDARY BATTERY

(75) Inventors: Vinh X. Bui, Round Rock, TX (US); Nikolai V. Vyssotski, Elgin, TX (US)

(73) Assignee: Dell Products L.P., Round Rock, TX (US)

( * ) Notice: Subject to any disclaimer, the term of this patent is extended or adjusted under 35 U.S.C. 154(b) by 45 days.

(21) Appl. No.: 10/418,794

(22) Filed: Apr. 18, 2003

(65) Prior Publication Data

US 2004/0210406 A1 Oct. 21, 2004

(51) Int. Cl.[7] .......................... G01R 31/36; G06F 19/00
(52) U.S. Cl. ............................. 702/63; 702/60; 702/62; 702/65; 320/107; 320/108
(58) Field of Search ............................... 702/57–59, 65, 702/60, 62, 63, 64; 320/107, 118, 136, 137, 149

(56) References Cited

U.S. PATENT DOCUMENTS

| | | | |
|---|---|---|---|
| 5,477,123 A | * | 12/1995 | Allen et al. .................. 320/124 |
| 5,485,073 A | | 1/1996 | Kasashima et al. |
| 5,822,600 A | * | 10/1998 | Hallowell et al. .......... 713/340 |
| 5,955,867 A | * | 9/1999 | Cummings et al. ......... 320/107 |
| 6,163,131 A | | 12/2000 | Gartstein et al. |
| 6,346,794 B1 | | 2/2002 | Odaohhara |
| 6,429,626 B1 | | 8/2002 | Konno et al. |
| 6,456,948 B1 | | 9/2002 | Lim |
| 6,509,717 B2 | | 1/2003 | Lee |
| 6,580,623 B1 | * | 6/2003 | Williams et al. .............. 363/78 |

OTHER PUBLICATIONS

Compaq Computer Corporation, Intel Corporation, Microsoft Corporation, Phoenix Technologies, Ltd., Toshiba Corporation, "Advanced Configuration and Power Interface Specification", pp. 1–43, 126, 236–276, 293–316 and 317–328, Oct. 11, 2002.

Embedded.com, "How to Talk Smart", no date.

Weissel, Andreas, Bellosa, Frank, Process Cruise Control, Event–Driven Clock Scaling for Dynamic Power Management, no date.

Duracell, Inc. and Intel Corporation, "Smart Battery Data Specification", Feb. 15, 1995.

* cited by examiner

Primary Examiner—Bryan Bui
(74) Attorney, Agent, or Firm—Haynes and Boone, LLP (57) ABSTRACT

An information handling system includes a power management apparatus which is capable of selectively coupling to primary and secondary batteries that provide portable and backup power to the information handling system. The power management apparatus senses when the voltage at the power input of the information handling system drops below a predetermined threshold voltage. Respective switching diodes between the primary battery and the power input and the secondary battery and the power input are used as a means of fast hardware connection of the selected battery to the power input. Respective bypass switches are connected in parallel with the switching diodes. Control software instructs the bypass switch across the diode associated with the selected battery to close to prevent diode power loss. In this manner, a selected primary or secondary battery is independently switched to the power input, provided the selected battery exhibits a voltage greater than the predetermined threshold voltage.

24 Claims, 5 Drawing Sheets

INFORMATION HANDLING SYSTEM INCLUDING A POWER MANAGEMENT APPARATUS CAPABLE OF INDEPENDENTLY SWITCHING BETWEEN A PRIMARY AND SECONDARY BATTERY

BACKGROUND

The disclosures herein relate generally to information handling systems and more particularly to an information handling system employing a battery discharge system that accommodates multiple batteries.

As the value and use of information continue to increase, individuals and businesses seek additional ways to process and store information. One option available to users is information handling systems. An information handling system generally processes, compiles, stores, and/or communicates information or data for is business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems often include battery systems to provide power during standalone portable operation and in the event of system power failure when docked to the AC mains by a docking station. A high capacity secondary battery is often used in addition to a primary battery to supply power to the system. These batteries are coupled via a discharge circuit to the main power input or power rail of the system. The discharge circuit controls which particular battery is providing power to system. It is desirable that the discharge circuit be able to rapidly switch between the batteries without causing a system shutdown.

Prior battery discharge circuits were able to discharge the primary and secondary batteries by imposing constraints on the cell stack. The cell stacks which formed both the primary and secondary batteries were forced to be the same. In other words, if the primary battery employed four 3.6 volt lithium ion cells, then the secondary battery also was required to employ the same cell stack, namely four 3.6 volt lithium ion cells. Using the same cell stack assured the same working range of voltage for both the primary and secondary battery. With this constraint in force, a discharge circuit employing a respective diode to connect each battery "diode OR" to the systems' power rail could be employed. Whichever battery had the higher voltage at a particular point in time would forward bias its respective diode and couple the battery to the power rail. Unfortunately, this approach has a number of shortcomings. First, it is inefficient due to diode losses. Second, such a discharge circuit provides no control over which battery discharges first because the battery with the highest voltage will be the battery which is connected to the power rail. In other words, in the above approach the discharge circuit can not discharge one battery independent of the other battery.

Another conventional discharge battery discharge circuit employed so-called smart batteries and a smart battery selector compliant with the Smart Battery Specification (SBS) to control the battery discharge sequence. Unfortunately, that approach relies on relatively expensive SBS compliant integrated circuits and expensive smart batteries. This approach does not function with less expensive so-called dumb batteries.

What is needed is an information handling system with a discharge circuit that can discharge each battery independently. It is further desirable that the discharge circuit be independent of battery cell stack, state of charge and battery chemistry. It is also very desirable that the discharge circuit have minimal losses to more effectively operate in a portable information handling system environment.

SUMMARY

Accordingly, in one embodiment, an information handling system is provided including a processor coupled to a power input of the information handling system. The system also includes a primary battery and a secondary battery. The system further includes a switching apparatus for selectively coupling one of the primary and secondary batteries to the power input under the direction of control software. The switching apparatus couples the selected battery to the power input independent of the state of charge of the selected battery, provided the selected battery exhibits a voltage greater than a predetermined threshold voltage.

A principal advantage of the embodiment disclosed herein is that the primary and secondary batteries can be of any chemistry and cell stack. Moreover, the system operates with either smart batteries or dumb batteries.

DETAILED DESCRIPTION

Figure 1:
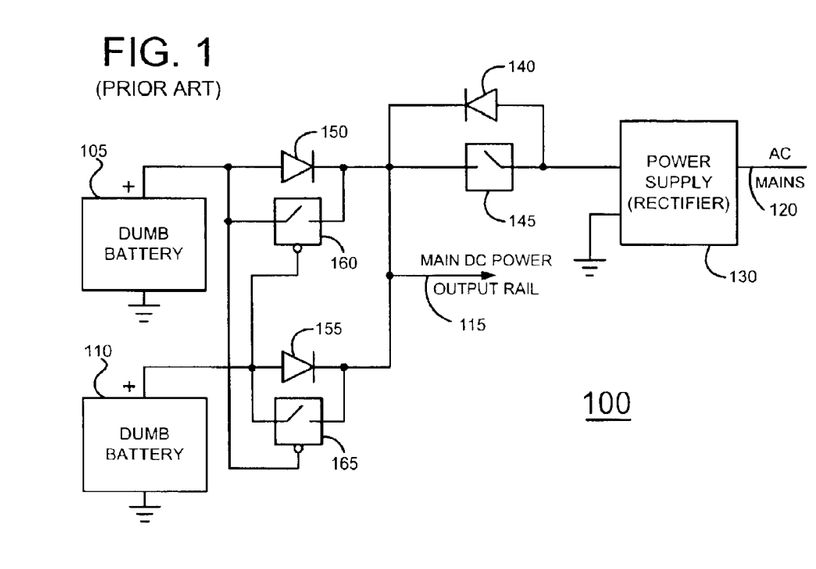
FIG. 1 is a block diagram illustrating a conventional dumb battery discharge circuit for use with an information handling system.

FIG. 1 is a block diagram of a conventional battery discharging circuit 100 which illustrates in more detail the problem to be solved in information handling systems using such a discharging circuit to connect to multiple batteries.

Disharging circuits for information handling systems are known that operate with "dumb batteries". Dumb batteries are typically defined as batteries that contain no internal electronic circuitry with which to communicate to regulate the charging, discharging and other parameters associated with the battery. In contrast, "smart batteries" are often defined as batteries which contain electronic circuitry with which to communicate for the purpose of regulating battery parameters such as state of charge, charge rate and discharge rate. In FIG. 1, discharging circuit 100 includes dumb batteries 105 and 110 which are tasked with keeping a main DC power output rail 115 at a safe DC voltage level when AC mains 120 is not supplying discharging circuit 100 with adequate power levels. Conventional battery discharge circuit 100 requires that dumb battery 105 and dumb battery 110 contain the same cell stack and chemistry to function properly. Cell stack is typically defined as the number of internal cells within a battery that when stacked together define its total voltage potential. Battery chemistry is often defined by the material used to fabricate a battery and may include such materials as lithium, lithium ion, nickel cadmium, nickel metal hydride and lead, for example.

AC mains 120 supplies, power to a power supply 130. Power supply 130 includes a rectifier and filter (not shown) which supply power to the main DC power output 115 through a diode 140. A switch 145 is coupled in parallel with diode 140 to allow the diode to be bypassed to reduce power loss when AC mains 120 is supplying adequate power to main DC power output 115. When AC mains 120 is no longer supplying discharging circuit 100 with adequate power, switch 145 opens and diode 145 becomes reverse biased. Dumb batteries 105 and 110 then take over and supply main DC power output 115. Whichever one of batteries 105 and 110 currently exhibits the higher voltage will "win" and supply power to main DC power output 115.

More specifically, a diode 150 is used to enable the fast switching of power between dumb battery 105 and main DC power output 115. Similarly, a diode 155 is used to enable the fast switching of power between dumb battery 110 and the main DC power output 115. Diodes 150 and 155 exhibit significant power losses. The loss of power in diode 150 occurs when diode 150 is used as the current path from dumb battery 105 to supply the main DC power output 115. Diode 150 will typically act as a resistive element in the circuit. To address this resistive loss problem, a diode bypass switch 160 is used in battery discharge circuit 100 to eliminate the power losses associated with diode 150 and providing an alternate and more direct current path. Similarly a diode bypass switch 165 is used to bypass diode 155 to reduce power losses associated with diode 155 when dumb battery 110 is in a discharge state and supplying power to main DC power output 115.

A limitation of battery discharge circuit 100 is its inability to activate the diode bypass until the weaker of the two dumb batteries drops low enough in voltage to activate a bypass switch. When dumb battery 105 drops in voltage below approximately 0.7 volts, switch 165 is closed and used to bypass diode 155. Alternatively, when dumb battery 110 discharges to approximately 0.7 volts or below, switch 160 is closed and bypasses diode 150. In the scenario where neither dumb battery 105 nor dumb battery 110 is discharged to near zero state (approximately 0.7 volts or below), diodes 150 and 155 are not bypassed. Thus, the losses associated with these diodes unfortunately remain an active part of the battery discharge circuit. Battery discharge circuit 100 also exhibits the limitation that it is not capable of independently switching battery 105 and 110 into the circuit to supply power to the main DC power output. Battery discharge circuit 100 relies on the state of charge of the respective batteries to achieve battery switching.

Figure 2:
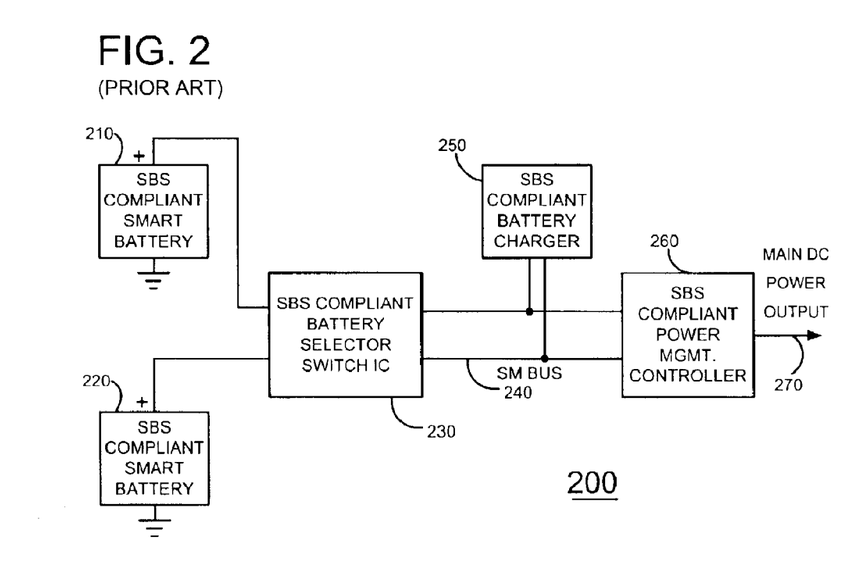
FIG. 2 is a block diagram of a conventional battery smart battery discharge circuit for use with an information handling system.

FIG. 2 is a block diagram of a conventional smart battery discharge circuit 200 which illustrates in more detail other problems to be solved. Discharge circuit 200 is used to supply power to some information handling systems. As mentioned earlier, smart batteries which communicate with external control circuitry have been developed. One type of smart battery is the industry standard Smart Battery Specification (SBS) compliant battery. In discharge circuit 200, SBS compliant smart batteries 210 and 220 are coupled to an SBS compliant battery selector switch 230. One function of SBS compliant battery selector switch 230 is to provide battery voltage to an industry standard System Management Bus (SMBus) 240 coupled thereto. An SBS compliant battery charger 250 and an SBS compliant power management controller 260 are coupled to SMBus 240 as shown. SBS compliant battery selector switch 230 together with SMBus 240 provide a pathway to allow SBS compliant battery charger 250 access to SBS compliant smart batteries 210 and 220 for charging purposes. SBS compliant power management controller 260 controls the main DC power output 270. To achieve independent battery switching, discharge circuit 200 requires that SBS intelligent electronics be imbedded in smart batteries 210 and 220 as well as all of the SBS compliant components described above. This is costly and illustrates one of the problems associated with the design of FIG. 2.

Figure 3:
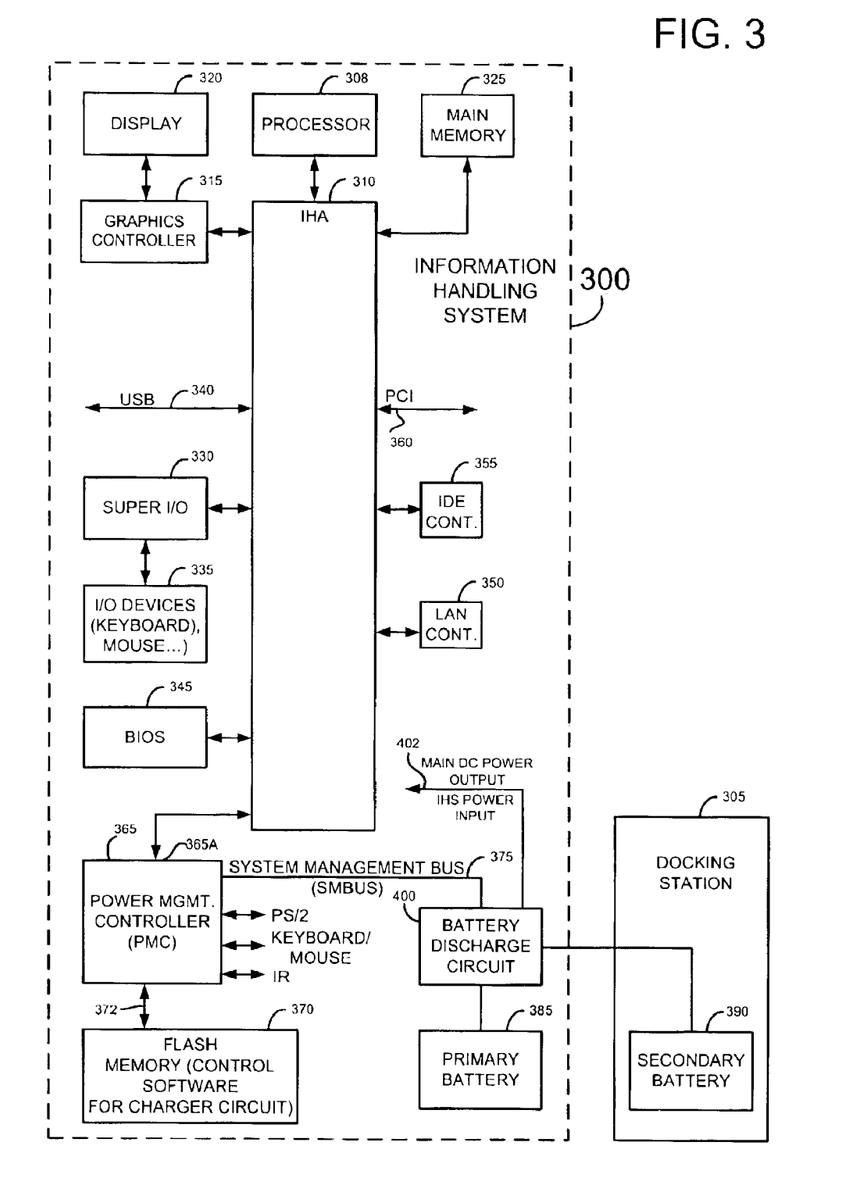
FIG. 3 is a block diagram of an embodiment of the disclosed information handling system including a power management system with a battery discharge circuit which solves the problems associated with the circuits of FIG. 1 and FIG. 2.

FIG. 3 is a block diagram of the disclosed information handling system 300 which addresses the above-described problems. Information handling system 300 is an example of one system in which the disclosed technology is practiced. For purposes of this disclosure, an information handling system may include instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

As seen in FIG. 3, information handling system 300 is coupled to a docking station 305. Information handling system 300 includes a processor 308 such as an Intel Pentium series processor or one of many other processors currently available. An Intel Hub Architecture (IHA) chipset 310 provides information handling system 300 with graphics/memory controller hub functions and I/O functions. More specifically, IHA chipset 310 acts as a controller which communicates with a graphics controller 315 coupled thereto. A display 320 is coupled to the graphics controller 315. IHA chipset 310 further acts as a controller for main memory 325 which is coupled thereto. IHA chipset 310 also acts as an I/O controller hub (ICH) which performs I/O functions. A super input/output (I/O) controller 330 is coupled to IHA chipset 310 to provide communications between IHA chipset 310 and input devices 335 such as a pointing device and keyboard for example. A universal serial bus (USB) 340 is coupled to IHA chipset 310. System basic input-output system (BIOS) 345 is also coupled to IHA chipset 310 as shown.

A local area network (LAN) controller 350, alternatively called a network interface controller (NIC), is coupled to IHA chipset 310. Integrated drive electronics (IDE) controller 355 is coupled to IHA chipset 310 so that devices such as media drives can be connected to processor 308 and other components of the system. Devices that can be thus coupled via IDE controller 355 include hard disk drives, CD-ROM drives, DVD drives and other fixed or removable media drives. An expansion bus 360, such as a Peripheral Component Interconnect (PCI) bus, is coupled to IHA chipset 310 as shown. Expansion bus 360 includes one or more expansion slots (not shown) for receiving expansion cards which provide the information handling system 300 with additional functionality.

A power management controller (PMC) 365 is coupled to IHA chipset 310 via output 365A to provide communication between processor 308 and power management controller 365. A microcontroller is typically employed to implement power management controller 365. A nonvolatile memory 370, such as FLASH memory for example, may be coupled to power management controller 365 via a bus 372 as shown. Nonvolatile memory 370 includes executable control software or firmware that provides software control for power management controller 365 as will be described later in more detail. Power management controller 365 communicates through a system management bus (SMBus) 375 to a battery discharge circuit 400 coupled thereto. Battery discharge circuit 400 includes a main power output 402 which is which is coupled to the components of information handling system 300 by connections not shown. Main DC power output 402 is also referred to as the main power input of information handling system 300 in the subsequent description. Thus, battery discharge circuit 400 provides power to the components of information handling system 300.

Primary battery 385 is coupled to discharge circuit 400 as shown to provide primary power to information handling system 300 in a portable or un-docked state. When information handling system 300 is coupled to docking station 305 as shown in FIG. 3, a secondary battery 390 becomes coupled to battery discharge circuit 400 as shown. Moreover, when information handling system 300 is coupled to docking station 305, power management controller 365 communicates with discharge circuit 400 through system management bus 375 and provides for independent switching control of the primary battery 385 and secondary battery 390. The disclosed information handling system 300 is capable of independent switching, namely selecting one of primary battery 385 and secondary battery 390 as the power source independent of the state of charge of either battery. This independent switching action is provided under software control by power management controller 365 working in conjunction with battery discharge circuit 400 as a power management apparatus for information handling system 300.

Figure 4:
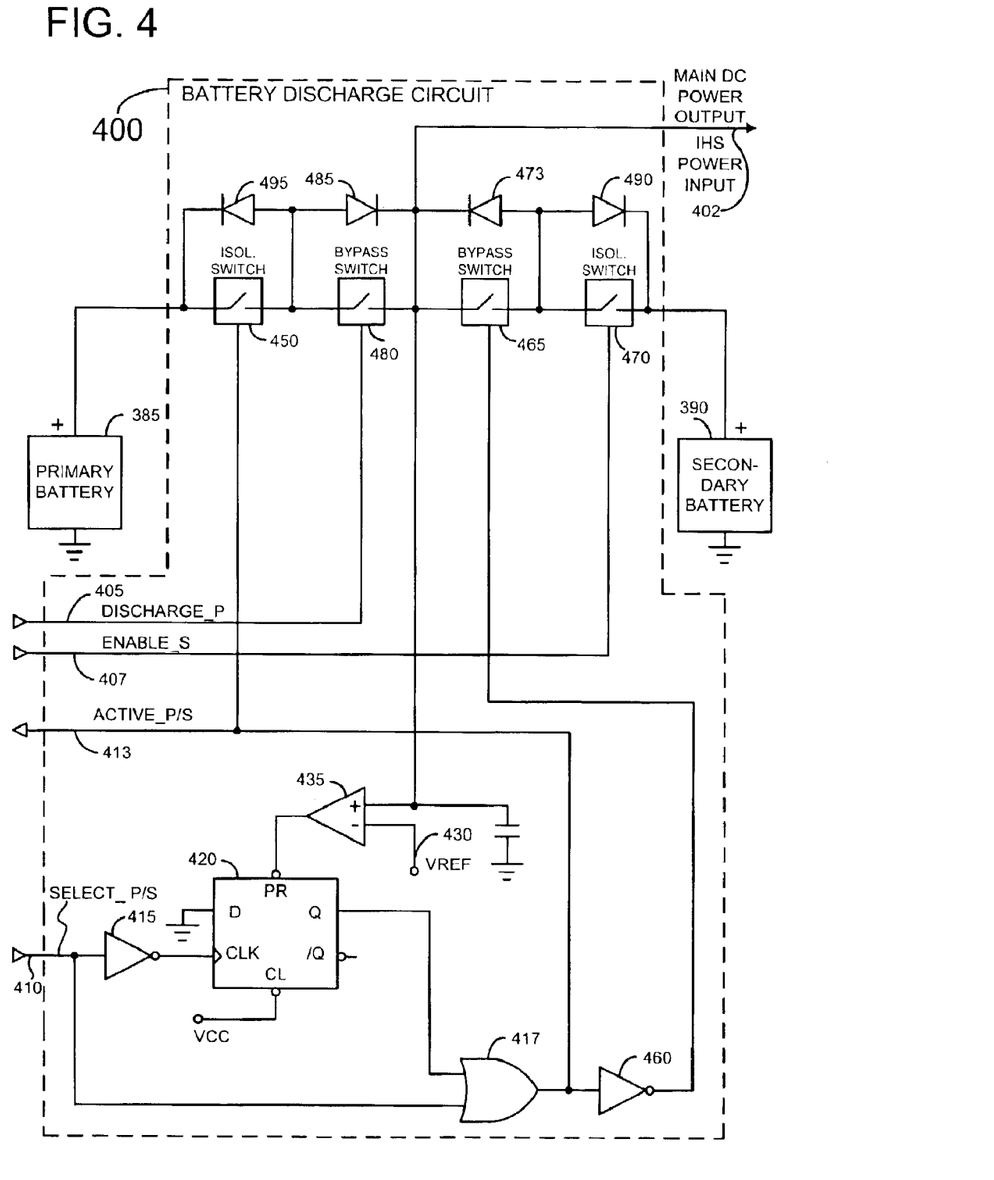
FIG. 4 is a hardware block diagram of the battery discharge circuit used in the information handling system of FIG. 3

FIG. 4 shows a more detailed representation of one embodiment of the disclosed battery discharge circuit 400 which is a state driven hardware discharge circuit. Battery discharge circuit 400 is supplied with input signals or interface signals from power management controller 365 under software control. Power management controller (PMC) 365 (shown earlier in FIG. 3) supplies the following input signals to battery discharge circuit 400. A DISCHARGE_P input signal is supplied to input 405 and an ENABLE_S input signal is supplied to input 407. A SELECT_P/S input signal is supplied to input 410 Battery discharge circuit 400 generates an ACTIVE_P/S signal at output 413 which is fed back to power management controller 365. All signals within battery discharge circuit 400 are "active low" signals indicating that when active the signals will be represented by a low or digital zero state in the hardware circuit. An active low signal is typically referred to as being "on" when low. These interface signals will be described in more detail later.

The initial state of battery discharge circuit 400 is now described. Initially, power management controller 365 provides discharge circuit 400 with the SELECT_P/S signal at input 410 in the low or "digital zero state" indicating an active low signal. Input 410 is coupled to the input of an inverter 415 and to one of two inputs of an OR gate 417 such that the SELECT_P/S signal is supplied to these components. Initially, the output of inverter 415 is thus high or in a "digital one state". The output of inverter 415 is coupled to the clock input of a D-type flip flop 420. The main DC power signal at power output 402 is generated by discharge circuit 400 and is continuously compared to a reference voltage VREF at reference voltage node 430 by a comparator 435. One representative value of VREF is 8.2 volts. This value will vary according to the particular application. Comparator 435 recognizes that the main DC power signal at battery discharge circuit output 402 is greater than reference signal VREF. This indicates that the main DC power at output 402 exhibits an adequate voltage for the discharge circuit. In response comparator 435 provides a high state on its output. The SELECT_P/S signal instructs battery discharge circuit 400 to connect either primary battery 385 or secondary battery 390 to main power output 402. Such switching will occur provided the selected battery exhibits a voltage greater than the VREF threshold voltage.

The output of comparator 435 is coupled to the preset input of D-type flip flop 420 and does not preset the D-type flip flop 420 in this state. D-type flip flop 420 initially drives its Q output low, that output being coupled to the remaining input of OR gate 417. The output of OR gate 417 is thus initially low, and consequently the ACTIVE_P/S signal at output 413 is low indicating an active signal. Power management controller 365 receives this low ACTIVE_P/S signal which is provided thereto. The ACTIVE_P/S signal supplied to power management controller 365 indicates that a secondary battery 390 is in use supplying power to main DC power output 402. In addition the output of OR gate 417 is coupled to a switch 450 and causes switch 450 to remain open such that a primary battery 385 is not in use to supply voltage to main DC power output 402. Thus, at this point, primary battery 385 is not operating in a discharge mode in discharge circuit 400. The output of OR gate 417 is also coupled to the input of an inverter 460. The output of inverter 460 is coupled to a switch 465 which is initially in a closed state.

At input 407 the ENABLE_S signal generated by power management controller 365 is initially high, indicating that the signal is not active, and is supplied to a switch 470 which is thus initially in a closed state. Secondary battery 390 is coupled to switch 470 which is in parallel with a diode 490 as shown. Switch 470 is coupled to another switch 465 which is in parallel with diode 473. Switch 465 is coupled to main DC power output 402. As seen in FIG. 4, secondary battery 390 is in use to supply voltage to main DC power output 402 through switches 470 and 465. The DISCHARGE_P signal at input 405 is supplied by power management controller 365 and is initially in a low and active state, indicating that primary battery 385 is not presently requested to discharge and supply power. The DISCHARGE_P signal at input 405 drives a switch 480 open. Switch 480 is in parallel with a diode 485 as shown. At a higher level, the initial state can be further described as a condition where information handling system 300 is docked and receiving power from secondary battery 390 with primary battery 385 charged, available, but not yet in use to supply power to main power output 402.

The next state of discharge circuit 400 is now described as it relates to the embodiment of FIG. 4. The next state is described as the condition where secondary battery 390 drops below a useful voltage range either by discharging below VREF or by being physically removed from the system. Physical removal of secondary battery 390 can include the act of un-docking information handling system 300 from docking station 305 as further referenced in FIG. 3. In response to such discharge or removal, main DC power output 402 drops below the VREF reference voltage at node 430 causing comparator 435 to output a low signal and drive the preset signal of D-type flip flop 420 low. This action causes the D-type flip flop 420 to generate a high state at the Q output. In response OR gate 417 outputs a high and subsequently this signal is supplied to power management controller 365 as the ACTIVE_P/S signal at output 413. The high output signal of OR gate 417 drives a switch 450 in parallel with a diode 495 closed. Primary battery 385 couples to a diode 485 through switch 450. Diode 485 acts as a fast switch to provide power from primary battery 385 to main DC power output 402. The DISCHARGE_P signal at input 405, generated by power management controller 365, is taken high to close switch 480. Switch 480 is used to bypass diode 485 to reduce the power loss between primary battery 390 and the main DC power output 402. Switch 480 acts under software control more slowly than the fast switching action provide by diode 485. In response to the high ACTIVE_P/S signal at input 413, inverter 460 outputs a low state and drives switch 465 open. This action disconnects secondary battery 390 to prevent secondary battery 390 from providing power to main DC power output 402 and enables diode 490 to be used as a charging path for secondary battery 390 when present. Diode 495 is used as a charging path for primary battery 385 as required. Power management controller 365 generates a low ENABLE_S signal at input 407 to open switch 470 and further isolate secondary battery 390 from providing power to the main DC power output 402.

Power management controller 365 provides a high SELECT_P/S signal at input 410 high to select primary battery 390 as the source for main DC power output 402. Power management controller 365 has the ability to select which one of primary battery 385 and secondary battery 390 will be coupled to main power output 402 independent of their state of charge, provided each battery exhibits a voltage greater then the VREF threshold voltage.

To accomplish battery selection via software control, power management controller 365 supplies a low SELECT_P/S signal at input 410. In response inverter 415 generates a high signal at the positive clock input of D-type flip flop 420. Under this condition, D-type flip flop 420 will output a low signal to OR gate 417 in turn driving switch 450 open. By driving the input of inverter 460 with a low the resultant high output of inverter 460 will drive switch 465 closed thereby changing the source of the main DC power output 402 from primary battery 385 back to secondary battery 390. It is noted that D flip flop 420 acts as a memory and thus causes battery discharge circuit 400 to be a state machine which behaves differently depending on the previous state of D flip flop 420. Independent switching between primary battery 385 and secondary battery 390 is thus provided regardless of the charge state of either battery, provided the battery to which switching is desired exhibits a voltage greater than the VREF threshold.

A summary of the operation of battery discharge circuit 400 is now provided. Battery discharge circuit 400 is normally in a state where both primary battery 385 and secondary battery 390 are charged to a voltage above the VREF reference voltage at node 430. Provided each battery is charged up above VREF, either primary battery 385 or secondary battery 390 can be selected, and be used as, the source to provide power to main DC power output 402. Initially, battery discharge circuit 400 is in a state where primary battery 385 is discharging in a conduction path that provides power to main DC output 402. To achieve this initial state, control software associated with PMC 365 instructs isolation switch 470 to open to isolate secondary battery 390 to prevent it from being discharged. The control software instructs isolation switch 450 to close to create a series conduction path between primary battery 385, closed isolation switch 450, series diode 485 and main DC power output 402. After a settling time for the battery discharge circuit hardware (delay), the control software instructs bypass switch 480 to close. When so closed, bypass switch 480 bypasses diode 485 in parallel to reduce losses associated with that diode.

At any time the control software can request that battery discharge circuit 400 independently switch from primary battery 385 to secondary battery 390. To accomplish this switching to the secondary battery as the power source, the control software instructs isolation switch 450 to open thus isolating primary battery 385. The control software then closes isolation switch 470 to form a series conduction path between secondary battery 390, closed isolation switch 470, series diode 473 and main DC power output 402. After a settling time for the hardware (delay), the control software instructs bypass switch 465 to close in parallel with diode 473 to reduce losses in diode 473 which is in the conduction path between secondary battery 390 and main DC power output 402. The control software can instruct battery discharge circuit 400 to independently switch back again from the secondary battery to primary battery, or vice versa, at any time.

It is noted that the control software can attempt to independently switch between the primary and secondary batteries, but until the selected battery exhibits a voltage greater than VREF, the battery discharge circuit hardware will not allow such switching to occur. In the scenario where information handling system 300 is docked to docking station 305 and no AC power is provided to the docking station, both primary battery 385 and secondary battery 390 are available for powering the system provided their respective voltages are greater than VREF. For purposes of discussion, it is assumed that both the primary and secondary battery exhibit a voltage greater than VREF. Battery discharge circuit 400 is aware of its state and reports status information (ACTIVE_P/S) back to the control software of PMC 365. Under these conditions, the control software can independently switch between the primary and secondary batteries at will. Battery discharge circuit 400 executes the control software's request to switch to either battery and then informs the control software that it did so via the ACTIVE_P/S status signal. Once the control software is informed that one of the two batteries is selected, then the control software instructs the bypass switch across the diode in the conduction path of the selected battery to close to reduce power loss.

Another scenario is now considered in which information handling system 300 is docked to docking station 305 and one of batteries 385 and 390 is discharged below the VREF threshold level and the other battery exhibits a charge above VREF. In this case, the battery discharge circuit hardware switches to the battery whose voltage is greater than VREF and ignores any additional control software requests to switch to the remaining battery. The battery discharge circuit still informs the control software of the action taken via the ACTIVE_P/S signal which is fed back to PMC 365. The control software then instructs the battery discharge circuit to close the bypass switch of the diode that is in the conduction path of the selected battery to reduce losses between the selected battery and main DC power output 402. It is noted that the control software can attempt to independently switch between the primary and secondary batteries, but until the battery requested by the control software exhibits a voltage greater than VREF the battery discharge circuit hardware will not permit connection to the requested battery.

The diode switching action described above is a hardware mode in the sense that diode hardware and D flip flop 420 hardware work together to couple the selected battery to main power output 402. However this hardware works in response to the SELECT_P/S signal generated by the control software which drives PMC 365. The bypassing switching action is regarded as a software mode because the bypass switches operate directly in response to the control software.

Figure 5:
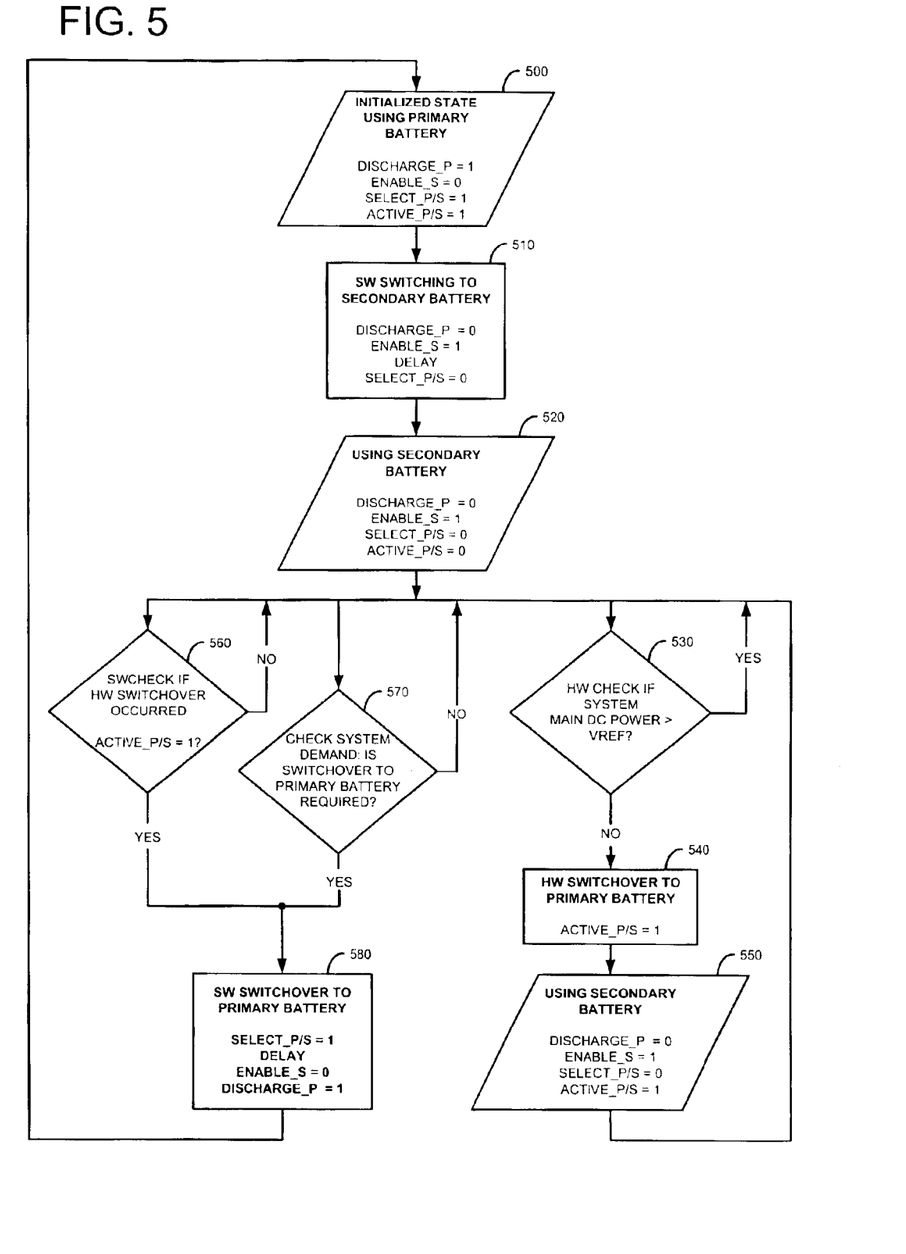
FIG. 5 is a flow chart showing software and hardware process flow of the power management system of FIG. 3 and FIG. 4.

FIG. 5 is a flow chart which shows the process flow of the hardware and software states of disclosed battery discharge circuit 400 coupled to information handling system 300 (described in detail in FIG. 3 and FIG. 4). Battery discharge circuit 400 is initialized as per block 500. The initial state is described as "INITIALIZED STATE USING PRIMARY BATTERY" in which primary battery 385 is in a discharge state and thereby supplying power to main DC power output 402. The DISCHARGE_P signal at input 405 is set high, the ENABLE_S signal at input 407 is set low, and the SELECT_P/S signal at input 410 is set high by power management controller 365. Discharge circuit 400 sets the ACTIVE_P/S signal at output 413 high. These input and output signals are described in more detail in the discussion of FIG. 4. Battery discharge circuit 400 switches to using secondary battery 390 as per block 510. Thus secondary battery 390 now supplies power to main DC power output 402. Power management controller 365 sets the DISCHARGE_P signal at input 405 low, the ENABLE_S signal at input 407 high and the SELECT_P/S signal at input 410 low. This action uncouples primary battery 385, and couples secondary battery 390 to main DC power output 402. Battery discharge circuit 400 is now using secondary battery 390 to provide output power as per block 520. Thus during this state, discharge circuit 400 sets the ACTIVE_P/S signal low to indicate to power management controller 365 that the hardware has switched over to secondary battery 390 use as instructed by software. It is noted that the software described by the flow chart of FIG. 5 is contained within power management controller 365 or within nonvolatile memory 370 coupled thereto.

Battery discharge circuit 400 now conducts a test at decision block 530 to determine if main DC power output 402 is adequately above the reference voltage VREF at reference node 430. If the main DC power output 402 is not greater than the voltage VREF at reference node 430, then discharge circuit 400 switches to primary battery 385 per block 540. Under this condition, discharge circuit 400 sets the ACTIVE_P/S signal high to indicate to power management controller 365 that the hardware has switched over to use primary battery 385 as instructed by discharge circuit 400. Discharge circuit 400 remains in this state until requested to switch over to secondary battery 385 as per block 550. Power management controller 365 sets the DISCHARGE_P signal at input 405 low, the ENABLE_S signal at input 407 high, and the SELECT_P/S signal at input 410 low to cause switchover to secondary battery 390 use. Discharge circuit 400 responds, by setting the ACTIVE_P/S signal at output 413 high to indicate to power management controller 365 that it has responded to the software request. These hardware circuit actions are described in more detail with reference FIG. 4.

Discharge circuit 400 now returns to a monitoring condition as seen at decision block 530. Additionally two tests are performed by the software in power management controller 365 during this state. One of these two tests is described with reference to block 560 in which power management controller 365 tests to see if discharge circuit 400 hardware has performed the switchover to primary battery 385. This is accomplished by reading the ACTIVE_P/S signal at output 413. If the ACTIVE_P/S signal is high, then the switchover to primary battery 385 has occurred. However, if the ACTIVE_P/S signal is low, then the switchover has not occurred. The second of the two tests is described with reference to decision block 570. In this test power management controller 365 reads the status of system demand for a switchover to primary battery 385. System demand is defined as the condition whereby information handling system 300 is presenting a request to switch to primary battery 385 as the source for main DC output 402.

If either of the two tests per blocks 560 and 570 is true, then power management circuit 365 software determines that a switchover to primary battery 385 is required and executes such a request per block 580. More specifically, power management controller 365 sets the SELECT_P/S signal at input 410 high, and after a software delay, sets the ENABLE_S signal at input 407 low, and also sets the DISCHARGE_P signal at input 405 high. This action ensures that hardware and software states are congruent, such that the primary battery 385 is in use as the primary power source for main DC output 402 and returns to that initialized state per block 500 described previously.

Figure 6:
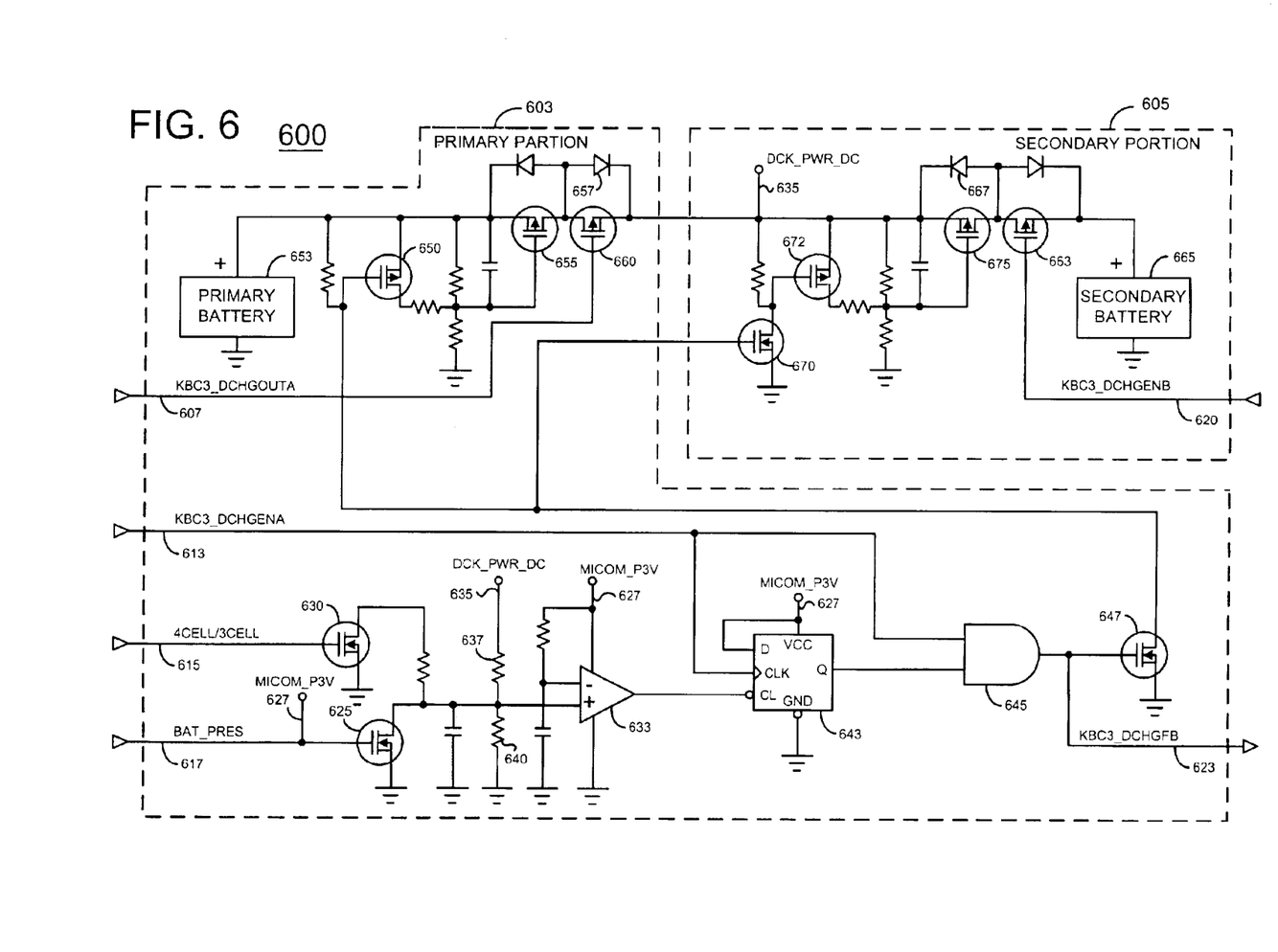
FIG. 6 is a more detailed schematic diagram of an embodiment of the battery discharge circuit of the power management system.

FIG. 6 shows a more detailed representation of a battery discharge circuit 600 which can be employed as battery discharge circuit 400 described earlier with reference to FIG. 4. Battery discharge circuit 600 includes a primary portion 603 and a secondary portion 605. Primary portion 603 is defined as the portion of discharge circuit 600 which is associated with primary battery 653 and secondary portion 605 is defined as the portion of discharge circuit 600 which is associated with secondary battery 685. Discharge circuit 600 is shown in a "docked" state wherein secondary battery 665 which is located in a docking station is coupled to secondary portion 605 of discharge circuit 600. In this case, the portable information handling system and docking station are physically connected.

Discharge circuit 600 is supplied with interface signals like those supplied to battery discharge circuit 400 by power management controller 365 of FIG. 4. These interface signals are briefly described in TABLE 1 below.

TABLE 1

| Interface Signal | Function |
| --- | --- |
| KBC3_DCHGOUTA | Enables the bypass of the diode associated with the primary battery |
| KBC3_DCHGENA | Selects the primary battery as the source of DC power |
| 4CELL/3CELL | Indicates whether the cell stack has 3 or 4 cells |
| BAT_PRES | Indicates that either the primary or secondary battery is in the discharge state. |
| KBC3_DCHGENB | Selects the secondary battery as the source of DC power |
| KBC3_DCHGFB | Indicates that the secondary battery has been switched into use |

A power management controller similar to controller 365 supplies the following input signals to discharge circuit 600. A KBC3_DCHGOUTA input signal is supplied to input 607. A KBC3_DCHGENA signal is supplied to input 613. A 4CELL/3CELL signal is supplied to input 615. A BAT_PRES signal is supplied to input 617 and a KBC3_DCHGENB signal is supplied to input 620. Discharge circuit 600 generates a KBC3_DCHGFB signal at output 623 which is fed back to information handling the power management controller.

In more detail, the BAT_PRES signal at input 617 is supplied to the gate input of a Field Effect Transistor (FET) 625 and generates a MICOM_P3V signal at node 627. It is noted that the MICOM_P3V signal is present in multiple locations within discharge circuit 600 and is noted, per industry standard terminology, as node 627 and signal name MICOM_P3V. The 4CELL/3CELL signal at input 615 is supplied to the gate of a FET 630. Both FET 625 and FET 630 are used as switches to offset the relative voltage at the input of an operational amplifier (Op Amp) 633. Op Amp 633 is configured as a voltage reference and comparator. The BAT_PRES signal at input 617 and associated FET 625 are used to enable the Op Amp comparator 633 and signal the discharge circuit 600 that a battery is present to be sensed. The 4CELL/3CELL signal at input 615 and supplied to FET 630 modifies the reference voltage at the input of Op Amp 633 to correspond with the cell stack configuration associated with the particular battery in use. Op Amp 633 is supplied by a voltage reference developed with a DCK_PWR_DC signal at reference node 635 and a voltage divider through a resistor 637 and a resistor 640 taken to ground as shown at the positive input node of Op Amp 633. The DCK_PWR_DC signal at reference node 635 is shown in multiple locations in the diagram of discharge circuit 600 to facilitate clarity.

The output of Op Amp 633 changes state when the voltage of the battery in discharge, as referenced by the DCK_PWR_DC signal at node 635, drops below the reference voltage at the input of Op Amp 633. The output of Op Amp 633 drives the clear input of a D-type flip flop 643 which in turn sets the Q output low. The output of D-type flip flop 643 is used to latch the condition where DCK_PWR_DC signal at node 635 drops below the reference voltage developed at the input of Op Amp 633. The output of D-type flip flop 643 and the signal KBC3_DCHGENA at input 607 are supplied to the two inputs to an AND gate 645. The output of AND gate 645 generates the KBC3_DCHGFB signal at output 623 which is fed back to the power management controller and which also drives the gate of an FET 647 as shown. The output of FET 647 drives the gate of an FET 650 as shown. If the positive signal from a primary battery 653 is at a sufficient voltage to supply the DCK_PWR_DC signal at node 635, then that signal is conditioned and drives the gate of an FET 655. FET 655 in turn supplies the DCK_PWR_DC signal node 635 with the primary battery signal 653 through a diode 657. In this condition primary battery 653 is in a discharge state and supplying power to the DCK_PWR_DC signal node 635. The KBC3_DCHGOUTA signal at input 607 supplies the gate input of an FET 660 which is used to bypass diode 657 to eliminate the diode power losses during primary battery 653 discharge. In secondary portion 605 of battery discharge circuit 600, the signal KBC3_DCHGENB at input 620 provides control to the gate of an FET 663 which in turn supplies DCK_PWR_DC signal node 635 with a secondary battery signal 665 through a diode 667. FET 675 is used to bypass diode 667 and thereby eliminate diode power losses during secondary battery 665 discharge.

While an improved information handling system apparatus has been described above, a method of operating the information handling system is also disclosed. Briefly, the method includes providing primary and secondary batteries to supply power to a power input of the information handling system. The method also includes selecting one of the primary and secondary batteries as a selected battery. The method further includes switching the selected battery to couple to the power input independent of the state of charge of the selected battery, provided the selected battery exhibits a voltage greater than a predetermined threshold voltage.

An information handling system and method of operating the system is thus provided which is capable of independently switching between a primary and secondary battery. Diode losses are advantageously avoided. Moreover, the system is capable of independently switching either smart batteries or less expensive dumb batteries.

Although illustrative embodiments have been shown and described, a wide range of modification, change and substitution is contemplated in the foregoing disclosure and in some instances, some features of an embodiment may be employed without a corresponding use of other features. Accordingly, it is appropriate that the appended claims be construed broadly and in manner consistent with the scope of the embodiments disclosed herein.

What is claimed is:

1. An information handling system (IHS) coupled to a docking station comprising:
   a processor coupled to a power input of the IHS;
   a primary battery and a secondary battery; and
   a switching apparatus for selectively coupling one of the primary and secondary batteries to the power input under the direction of control software in response to voltage at the power input detecting a fault condition, the switching apparatus coupling the selected battery to the power input independent of the state of charge of the selected battery, provided the selected battery exhibits a voltage greater than a predetermined threshold voltage.

2. The IHS of claim 1 wherein the primary battery is a dumb battery.

3. The IHS of claim 1 wherein the secondary battery is a dumb battery.

4. The IHS of claim 1 wherein the primary battery is a smart battery.

5. The IHS of claim 1 wherein the secondary battery is a smart battery.

6. The IHS of claim 1 wherein the switching apparatus includes a nonvolatile memory for storing the control software.

7. The IHS of claim 1 wherein the primary and secondary batteries have the same number of cells.

8. The IHS of claim 1 wherein the primary and secondary batteries have a different number of cells.

9. An information handling system (IHS) coupled to a docking station comprising:
 a processor coupled to a power input of the IHS;
 a primary battery and a secondary battery, the batteries being of different chemistries and cell stack configurations; and
 a switching apparatus including:
  a first diode switch between the primary battery and the power input;
  a second diode switch between the secondary battery and the power input;
  the switching apparatus selectively coupling one of the primary and secondary batteries to the power input under the direction of control software in response to voltage at the power input detecting a fault condition, the switching apparatus coupling the selected battery to the power input independent of the state of charge of the selected battery, provided the selected battery exhibits a voltage greater than a predetermined threshold voltage;
  a first bypass switch coupled across the first diode switch, the first bypass switch closing under direction of the control software to bypass the first diode when the primary battery is the selected battery; and
  a second bypass switch coupled across the second diode switch, the second bypass switch closing under direction of the control software to bypass the second diode when the secondary battery is the selected battery.

10. A method of operating an information handling system coupled to a docking station comprising:
 providing primary and secondary batteries to supply power to a power input of the information handling system;
 selecting one of the primary and secondary batteries as a selected battery; and
 switching the selected battery to couple to the power input independent of the state of charge of the selected battery, provided the selected battery exhibits a voltage greater than a predetermined threshold voltage, the switching being in response to the power input detecting a fault condition.

11. The method of claim 10 wherein the primary battery is situated in the information handling system.

12. The method of claim 10 wherein the secondary battery is situated in the docking station which is adapted to be coupled to the information handling system.

13. The method of claim 10 further wherein the switching is requested by control software within the information handling system.

14. The method of claim 13 wherein the control software instructs switching to couple the primary battery to the power output and in response the secondary battery is isolated from the power output.

15. The method of claim 14 further including coupling the primary battery to the power output subsequent to isolating the secondary battery from the power output.

16. The method of claim 15 including coupling the primary battery to the power output by a diode therebetween, this coupling being a hardware mode.

17. The method of claim 16 including bypassing the diode to reduce power loss, the bypassing being at the direction of control software, this bypassing being a software mode.

18. The method of claim 13 wherein the control software instructs switching to couple the secondary battery to the power output and in response the primary battery is isolated from the power output.

19. The method of claim 18 further including coupling the secondary battery to the power output subsequent to isolating the primary battery from the power output.

20. The method of claim 19 including coupling the secondary battery to the power output by a diode therebetween, said coupling being a hardware mode.

21. The method of claim 20 including bypassing the diode to reduce power loss, said bypassing being a software mode.

22. The method of claim 10 wherein the primary and secondary batteries are dumb batteries.

23. The method of claim 10 wherein the primary and secondary batteries are smart batteries.

24. A method of operating an information handling system (IHS) coupled to a docking station, the method comprising:
 providing primary and secondary batteries to supply power to a power input of the IHS;
 selecting one of the primary and secondary batteries as a selected battery;
 switching the selected battery to couple to the power input via a diode therebetween, provided the selected battery exhibits a voltage greater than a predetermined threshold voltage, the switching being independent of the state of charge of the selected battery and being in response to the power input detecting a fault condition;
 isolating the selected battery if the voltage of the selected battery is less than the threshold voltage; and
 bypassing the diode upon command of control software after the diode has connected the selected battery to the power input.

* * * * *